United States Patent [19]

MacDonald

[11] Patent Number: 4,930,010

[45] Date of Patent: May 29, 1990

[54] APPARATUS FOR GENERATING A TWO-DIMENSIONAL COLOURED DISPLAY

[75] Inventor: Lindsay W. MacDonald, Bedfordshire, England

[73] Assignee: Crosfield Electronics Limited, London, England

[21] Appl. No.: 289,893

[22] Filed: Dec. 27, 1988

[30] Foreign Application Priority Data

Jan. 11, 1988 [GB] United Kingdom ................. 8800503

[51] Int. Cl.[5] ............................................. H04N 1/415

[52] U.S. Cl. ......................................... 358/78; 358/75; 358/56; 340/701

[58] Field of Search ........................ 358/56, 75, 78, 80; 340/701, 703

[56] References Cited

U.S. PATENT DOCUMENTS

| | | | |
|---|---|---|---|
| 4,393,399 | 7/1983 | Gast et al. | 358/80 |
| 4,410,909 | 10/1983 | Meda et al. | 358/78 |
| 4,521,803 | 6/1985 | Gittinger | 358/138 |
| 4,617,592 | 10/1986 | MacDonald | 358/80 |
| 4,639,770 | 1/1987 | Jung et al. | 358/78 |
| 4,719,482 | 1/1988 | Hora | 358/91 |
| 4,725,966 | 2/1988 | Sarloy et al. . | |
| 4,754,492 | 6/1988 | Malvar . | |
| 4,825,296 | 4/1989 | Wagensonner et al. | 358/76 |
| 4,843,379 | 6/1989 | Stansfield | 358/80 |
| 4,843,573 | 6/1989 | Taylor et al. | 358/80 |

FOREIGN PATENT DOCUMENTS

| | | |
|---|---|---|
| 0012420 | 6/1980 | European Pat. Off. . |
| 0017257 | 10/1980 | European Pat. Off. . |
| 0017553 | 10/1980 | European Pat. Off. . |

*Primary Examiner*—Howard W. Britton
*Assistant Examiner*—Kim Yen Vu
*Attorney, Agent, or Firm*—Sughrue, Mion, Zinn, Macpeak & Seas

[57] ABSTRACT

Apparatus for generating a two-dimensional coloured display in which there is a variation of colour across the display in a predetermined manner, the colour of each pixel in the display being defined by one or more colour components. The apparatus comprises, for each colour component, a memory for storing a pair of gradation curves (X(i), Y(i)) representing the variation in intensity of the color component in orthogonal directions X, Y across the display; a monitor; and processing apparatus. The processing apparatus determines a resultant colour component value V(i,j) for a pixel to be displayed at a location (i,j) on the monitor in accordance with the following formula:

$$V(i,j)=f[a(X(i))b(Y(j))+c(X(i))d(Y(j))]$$

where the pixel has coordinates i,j and k is a normalizing constant, and where a, c, are functions of X(i), b, d are functions of Y(j) and f is an output function, the functions being chosen such that V(i,j) exhibits no discontinuities for all values of X(i), Y(j). The monitor is responsive to the resultant colour component values V(i,j) to display a corresponding colour at a position in the display corresponding to that pixel.

7 Claims, 4 Drawing Sheets

(A) (B) (C)

(A) (B) (C)

APPARATUS FOR GENERATING A TWO-DIMENSIONAL COLOURED DISPLAY

FIELD OF THE INVENTION

The invention relates to apparatus for generating a two-dimensional coloured display in which there is a variation of colour across the display in a predetermined manner.

DESCRIPTION OF THE PRIOR ART

Such displays are commonly termed vignettes in which there is a gradation of colour or tone from one part of the display to another. These vignettes have conventionally been generated in digital form by scanning a hard copy version of the vignette using a conventional input scanner. More recently, vignettes have been generated synthetically. In all these cases, however, the full version of the vignette has been stored in a two-dimensional array of digital values, one set of digital values for each pixel in the final display. For a typical monitor having 1024 lines each of 1024 pixels, this requires 3 megabytes of storage space, for a full-colour image with 8 bits per pixel in each of the red, green and blue colour components.

The simplest form of vignette has a gradation in only one dimension, for example from top to bottom of the display, or from left to right. More complex vignettes are those in which there is a two-dimensional gradation, for example diagonally from one corner to the other. More complex still are those in which the gradation is not linear or not monotonic, such as up-down ramps or bell-shaped distributions (e.g. Gaussian).

In general, although some vignettes can be specified very precisely, it is common for vignettes to be created somewhat arbitrarily to give a pleasing visual effect. This is particularly true for design systems, where the operator, a graphic designer, wishes to modify the choice of colours, gradients, and locations within the display until the desired effect is achieved. Unfortunately, due to the need to update the full two-dimensional store with any modification, there can be a significant time interval between the operator making the modification and the result of that modification being displayed on a monitor screen.

Recently, it has been proposed to define a two-dimensional vignette using, for each colour component, two independent gradation curves X(i), Y(i) representing the variation in intensity of the colour component in respective orthogonal directions X,Y. These functions have then been combined by adding the respective values of the functions at each pixel concerned. The problem with this form of combination is that the simple addition of the values can lead to the generation of resultant values having magnitudes greater than the largest allowable value. For example, if the respective digital values are each in the range 0 to k, the addition of two pixel values can lead to a resultant value in the range 0 to 2k. This has been dealt with in the past simply by taking the resultant value modulo k+1 to generate a resultant value less than or equal to k (equivalent to the remainder on division by k+1). However, this can lead to sharp discontinuities in the resultant vignette, an effect which is visually objectionable.

SUMMARY OF THE INVENTION

In accordance with the present invention, apparatus for generating a two-dimensional coloured display in which there is a variation of colour across the display in a predetermined manner, the colour of each pixel in the display being defined by one or more colour components, comprises, for each colour component, a memory for storing a pair of gradation curves (X(i), Y(i)) representing the variation in intensity of the colour component in orthogonal directions X, Y across the display; display means; and processing means for determining a resultant colour component value V(i,j) for a pixel to be displayed at a location (i,j) on the display means in accordance with the following formula:

$$V(i,j)=f[a(X(i))b(Y(j))+c(X(i))d(Y(j))]$$

where the pixel has coordinates i,j and k is a normalizing constant, and where a, c, are functions of X(i), b, d are functions of Y(j) and f is an output function, the functions being chosen such that V(i,j) exhibits no discontinuities for all values of X(i), Y(j), the display means being responsive to the resultant colour component values V(i,j) to display a corresponding colour at a position in the display corresponding to that pixel.

We have devised apparatus which avoids the need for storing a full two-dimensional array of digital values defining the vignette by storing pairs of gradation curves for each colour component, yet avoids the discontinuity problems mentioned above by making use of certain formulae to combine the gradation curves to give a visually pleasing result.

Examples of suitable formulae are:

$$V(i,j)=X(i)Y(j)/k \quad (1)$$

and $$V(i,j)=[kX(i)+kY(j)-X(i)Y(j)]/k \quad (2)$$

The first formula set out above is a simple multiplication of the two curves and, if necessary, the resultant value V(i,j) can be further modified by multiplication or division by normalising constants and the like. This formula will always yield a resultant value less than the maximum allowable value k.

The second formula represents a form of non-linear addition, or blending, of X(i) and Y(j). It has the useful properties that the resultant value is never less than either of the components X(i) and Y(j), nor does it ever exceed k. Thus it is a well-behaved, bounded continuous function of two variables.

The advantage of the invention is that the speed at which a modification to the gradation curves made by the operator can be displayed is much quicker than has hitherto been possible. Thus, for any one colour component, a modification will generally involve the interactive adjustment of a single one-dimensional gradation curve. Conventional computer graphic manipulation techniques allow arbitrary sections of the curve to be adjusted. For example, one end-point of a straight line may be selected, while the other end remains fixed, and the line is manipulated as a "rubber band". Several points may be selected for piece-wise linear gradations, or for interpolation by curved segments such as cubic B-splines.

Since each curve is one-dimensional, however, this interpolation is very quick and in certain cases the modification to the contents of the gradation memory and the subsequent display of the resultant colour component can be achieved within the frame update time of the display means which is typically a monitor. A common frame rate for a monitor is 60 frames per second, so that the frame update time is 16.7 milliseconds.

Each gradation curve represents a density distribution, or variation in intensity, of one colour component along the corresponding axis (X or Y) of the display. Specification of an X gradation, a Y gradation and a combining formula, therefore, is sufficient to define the density of every pixel on the display. For a display of 1024 lines of 1024 pixels, the volume of data is reduced from 1 megabyte to 2 kilobytes, a compression factor of 512.

For truly interactive control over the generation of the vignette displays, the operator must be able to adjust the gradation curve and immediately see the effect on the colour display. This implies that both the gradation curves and the vignette display must be simultaneously visible. Three methods of achieving this are by superimposing the curves as a coloured graphic overlay on the vignette, by displaying the curves in a dedicated region (or "window") of the screen, or by making use of a separate monitor.

In the application of computer aided design and planning of page layouts for colour publications, it is frequently required to restrict the vignette to a certain area of the whole page displayed on the monitor. This can be achieved by generating the full-screen vignette as described herein but restricting its display by use of a mask memory to select either vignette or page information at each pixel position on the screen. Such an arrangement is described in U.S. Pat. No. 4,617,592 entitled "Video Retouching System".

The gradation curves will in some instances represent colour components not compatible with the display means. For example, if the display means comprises a monitor, this will be responsive to signals representing red, green, and blue colour components whereas the gradation curves may represent printing colour components such as cyan, magenta, yellow, and black. To deal with this, the resultant colour component values V(i,j) will subsequently be converted for each pixel to monitor format colour components prior to their application to the monitor.

Typically, the processing means will comprise a suitably programmed computer. Alternatively, at least part of the processing means may be implemented by discrete hardware components including look-up tables, multipliers, adders, and normalisers.

Depending on the implementation, the vignette generation by discrete hardware may occur before or after a display frame store memory. In one case, the generator may produce values for storage in the frame buffer; in the other case the generator may supply values directly to the display monitor, synchronous with the video data rate.

BRIEF DESCRIPTION OF THE DRAWINGS

Some examples of apparatus in accordance with the present invention will now be described with reference to the accompanying drawings, in which.

DETAILED DESCRIPTION OF THE EMBODIMENTS

Figure 1:
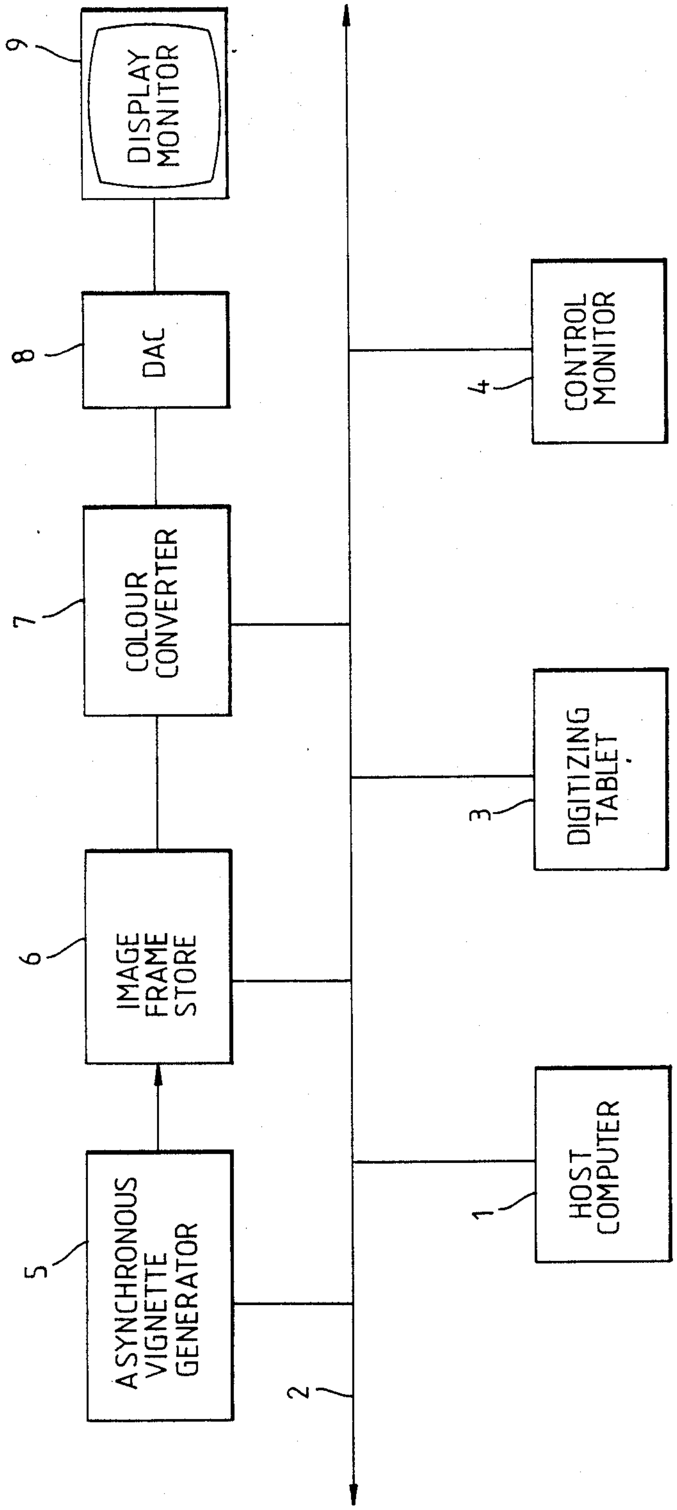
FIG. 1 is a block diagram of one embodiment of the apparatus.

The apparatus shown in FIG. 1 comprises a host computer 1, coupled to all other elements by an interconnect bus 2. The operator enters commands and coordinate data through a digitising tablet 3, and may receive information about the system, and in particular about vignette gradation curves, from an optional control monitor 4. A vignette generator 5 is supplied with gradation curve data and a combination formula by the host computer 1 and outputs a two-dimensional vignette image to the frame store 6. Typically, the pixel data of the image in the frame store 6 will define the printing colour components cyan, magenta, yellow and black. These are transformed by the colour converter 7 into corresponding red, green and blue signals, converted to electrical drive voltages by a digital to analogue converter 8 and fed to a display monitor 9.

Figure 2:
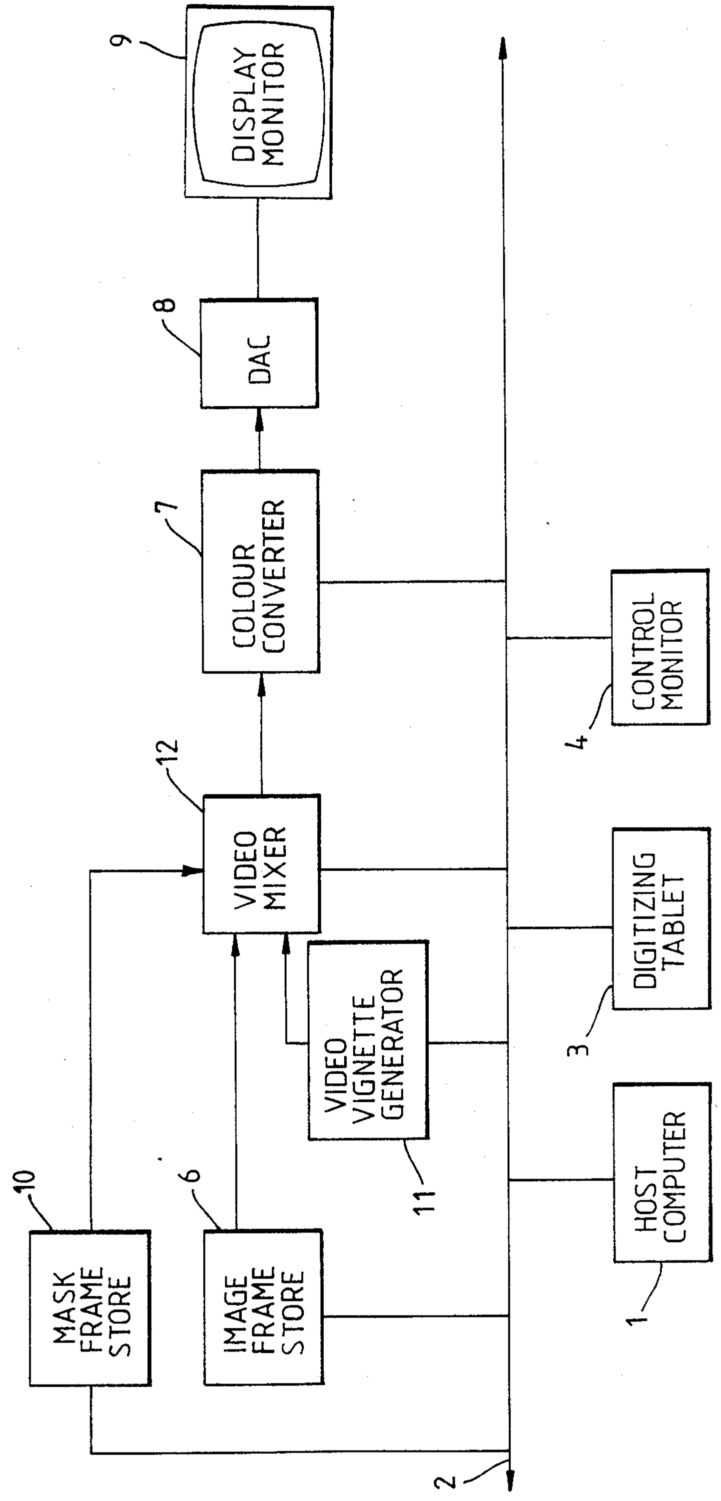
FIG. 2 is a block diagram of another embodiment of the apparatus.

FIG. 2 shows an alternative embodiment of the apparatus, in which the vignette generator 11 produces video data directly, synchronised with the video clock rate of the data in the path to the display monitor 9. The image frame store 6 in this case could be used to hold a digital image of a composite magazine page. A video mixer 12 then selects for each display pixel either the input pixel from the image store 6 or the pixel from the vignette generator 11, under the control of the corresponding 1-bit binary pixel from a mask frame store 10. The mask store 10 would have been loaded by the host computer 1 with a mask pattern containing value '1' at each pixel position where the vignette is to be displayed, and value '0' where the page image is to be displayed. The output of the video mixer 12 would be fed through colour converter 7, and digital to analogue converter 8 to the display monitor 9 as before.

The purpose of the apparatus in both FIGS. 1 and 2 is the same, namely to generate a vignette on the display screen responding interactively (that is, without perceptible delay) to the gradation curves specified by the operator. The two implementations differ in the way that they generate the video data. In FIG. 1 the generator runs asynchronously with the video, writing pixel data into the dual-ported frame store 6 (for example, V-RAM technology); in FIG. 2 the generator produces pixel data synchronously with the video signals and the vignette is never explicitly stored.

Figure 3:
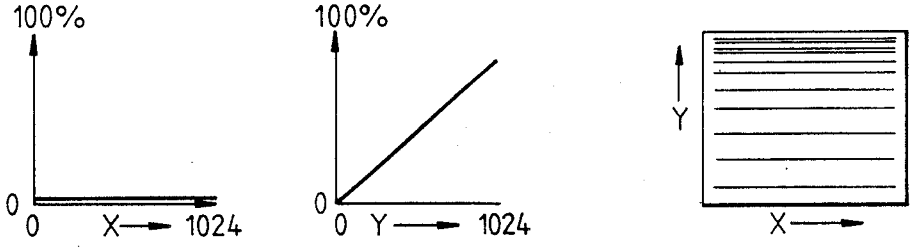
FIG. 3A illustrates for one colour component the variation in intensity in the X direction.
FIG. 3B illustrates the variation in intensity in the Y direction for the same colour component.
FIG. 3C illustrates schematically the resultant display produced by combining the curves in FIGS. 3A and 3B.

FIGS. 3A and 3B illustrate one setting of the gradation curves X(i) and Y(j) for a single colour component. Thus, FIG. 3A indicates that there is no variation in that colour component in the X direction whereas in the Y direction there is a variation from 0% density at the bottom of the display to 100% at the top. The effect of combining these two one-dimensional functions in a full screen display is illustrated schematically in FIG. 3C.

Figure 4:
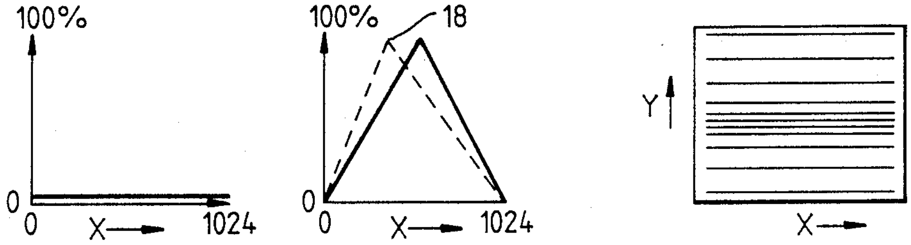
FIGS. 4A–4C are similar to FIGS. 3A–3C but for modified gradation curves.

Another example of a set of two gradation curves is illustrated in FIGS. 4A and 4B with the resultant display shown in FIG. 4C. In this case, the function X(i) is the same as before but the function Y(j) indicates that the colour component varies in the bottom to top direction from zero to 100% and back to zero, with the maximum intensity at the centre of the display. FIG. 4C illustrates the result of combining the two curves.

In order to avoid discontinuities in the vignettes, the combination of each pair of curves is carried out in such a way that a gradual change will always result from any pixel to its neighbours. Two specific methods for combining the curves are proposed, which are shown to be particular cases of a more general combination formula.

Figure 5:
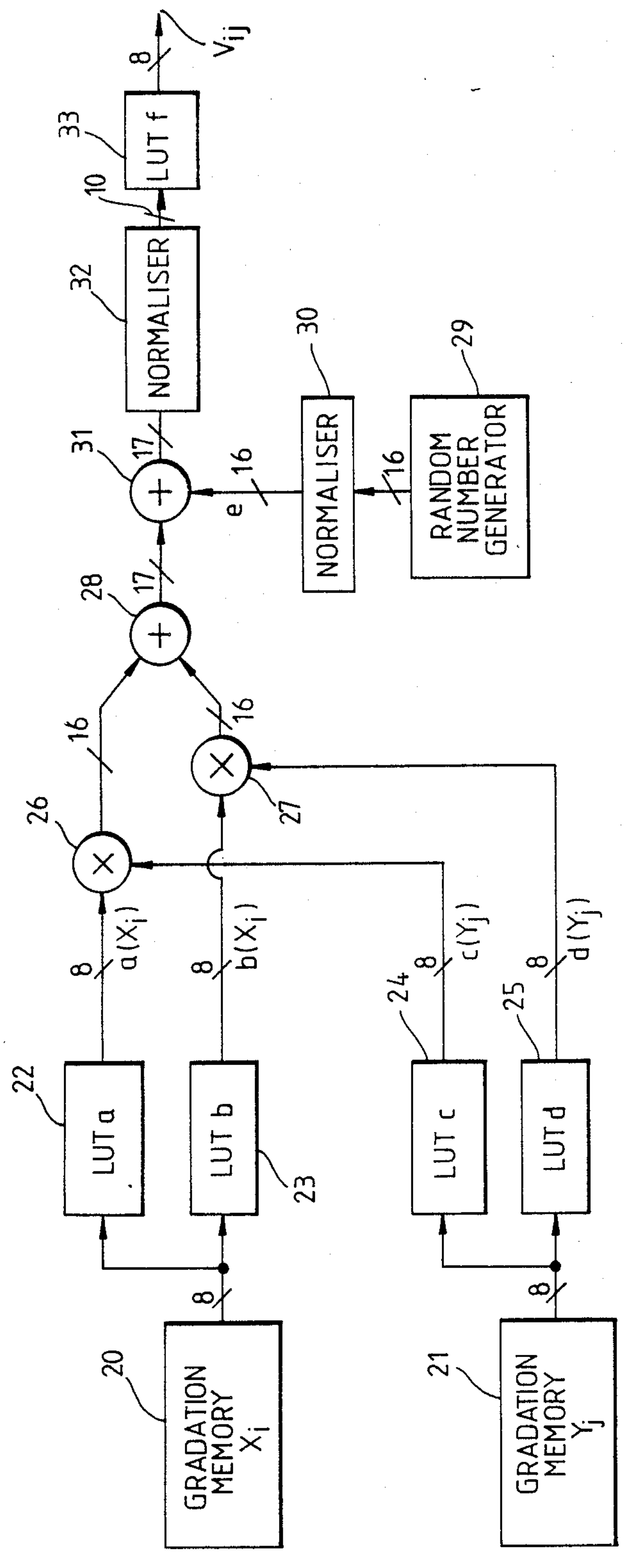
FIG. 5 is a block diagram of a hardware implementation of the vignette generator.

FIG. 5 shows a block diagram of the vignette generator, which applies equally to both the asynchronous type 5 (FIG. 1) and the synchronous video type 11 (FIG. 2). The circuity of FIG. 5 combines the two gradation curves for each pixel on the display screen for one colour component. Other colour components could be generated either by time multiplexing this one circuit or by replicating it for each colour.

Memories 20, 21 store the gradation curves for X and Y for the horizontal and vertical density profiles respectively. Each memory would contain 1024 8-bit values, addressed by indices i and j, the current column and row pixel addresses. The value read from X memory 20 is used as an index to two look-up tables 22, 23, each containing 256 8-bit values (a,b). Similarly the value read from Y memory 21 is used as an index to two further look-up tables 24, 25 (c,d). The 8-bit values read from look-up tables 22, 24 are multiplied by multiplier 26 to give a 16-bit product. Similarly, the 81-bit values read from look-up tables 23, 25 are multiplied by multiplier 27 to give a 16-bit product. The two products are added by adder 28 to yield a 17-bit sum.

In order to obscure quantising levels in the final vignette pattern, also known as Mach bands (see "Digital Image Processing, 2nd Edition", R. Gonzalez and G. Wintz, Addison Wesley 1987, pp. 19–20), we add a source of random noise to jitter the least significant bit of the output. Random number generator 29 produces 16-bit random numbers, which are shifted by normaliser 30 to align them with the least significant bit of the sum from the adder 28. The random noise is then added to the signal by adder 31, shifted to select the desired 10-bit field by normaliser 32 and used to index the final lookup table 33. This table contains 1024 8-bit values, and generates the required output value V(i,j).

The circuit shown in FIG. 5 implements the general mathematical relationship:

$$V(i,j)=f[a(X(i))b(Y(j))+c(X(i))d(Y(j))+e] \quad (3)$$

where:

V(i,j) is the output value
i,j are the column, row pixel addresses
X(i) is the horizontal density at position i
Y(j) is the vertical density at position j
a,c are functions of X(i)
b,d are functions of Y(j)
e is an error (noise) component
f is an output function The versatility of the circuit shown in FIG. 5 is demonstrated by some practical examples. To clarify the following explanations, the normalising constant k is assumed to be 1 so that all functions yield a fractional result in the range 0 to 1. In the first example, a simple multiplication of X(i) and Y(j) is required:

$$V(i,j)=X(i)Y(j) \quad (4)$$

This can be achieved by loading the look-up tables as follows:

a, b contain identity relationship (output=input)
c, d contain value 0 in all locations (output=0)

Then multiplier 26 generates the product X(i)Y(j) as a 16-bit value, multiplier 27 generates 0, so that adder 28 passes the product X(i)Y(j) unchanged. Random numbers generated by generator 29 would be shifted to 9 bits by normaliser 30, added to the product by 31, and the sum shifted by 6-bits to yield a 10-bit index to look-up table 33. This table would typically be loaded with address/4 in each location to give the desired output.

More generally, arbitrary powers of X(i) and Y(j) can be multiplied together:

$$V(i,j)=X(i)^{b(Y(j))}Y(j)^{c(X(i))} \quad (5)$$

That is, the result is the product of X(i) raised to the power c(Y(j)) and Y(j) raised to the power b(X(i)). This can be achieved by loading the tables as follows:

a,d contain logarithms, output=$\log_e$ (input)
c,b contain required functions of X(i), Y(j)
f contains antilogarithms, output=exp (input)

Note that in the case where b(Y(j))=1 for all Y(j) and c(X(i))=1 for all X(i), the equation (5) becomes identical to (4), namely the simple product of X(i) and Y(j).

The non-linear addition between X(i) and Y(j) given by equation (2) can be expressed with normalising constant k=1 as:

$$V(i,j)\ X(i)+(1-X(i))\ Y(j) \quad (6)$$

This can be achieved by loading the tables as follows:

a,d contain identity relationships (output=input)
c contains inverse identity (output=1-input)
b contains 1 in all locations Equation (6) can be shown to be a special case of a hyperbolic paraboloid (see, for example, the "VNR Concise Encyclopedia of Mathematics", Van Nostrand Reinhold 1979, pp. 544–5):

$$V(i,j)=\frac{X^2(i)}{a^2}-\frac{Y^2(j)}{b^2} \quad (7)$$

Such forms may also be implemented via the circuit shown in FIG. 5, by loading the tables as follows:

a contains function $X^2(i)/a^2$
c contains −1 in all locations
d contains function $Y^2(j)/b^2$
b contains 1 in all locations Finally, coordinate transformations such as rotation can be performed by versions of equation (3) such as:

$$V(i,j)=f\ [a\ \cos(X(i))\sin(Y(j))+b\ \sin\ (X(i))\cos(Y(j))] \quad (8)$$

The effect of this would be to rotate the composite vignette density distribution with respect to the screen.

In operation, the host computer 1 causes the control monitor 4 to display either all the gradation curves stored in memories 20–21 or at least the two gradation curves corresponding to a selected colour component. The current vignette generated by combination of the gradation curves stored in the memories 20, 21 is also displayed on the display monitor 9. The operator then indicates to the host computer 1 by using the digitising table 3 a desired modification to one or more of the displayed curves. For example, if the curves shown in FIGS. 4A and 4B are displayed, the operator may indicate that the position of 100% intensity in the Y direction should be changed to the point indicated at 18 in FIG. 4B. The computer 1 then calculates using a standard interpolation technique the values for the full range of the function Y(j) and the resultant values are stored in the corresponding memory 21. The contents of the memory 21 after this modification are then used to generate a new vignette on the display monitor 9. In this way, the operator can view very quickly the result of the change made to the curves and consider whether they are satisfactory.

Of course, the operator can decide whether to view just the colour separation corresponding to the component which he is modifying or the result of all four colour components, whether or not they have been modified. In addition, the operator can arrange to view just a part of the resultant vignette by applying a suitable mask in a conventional manner.

Typically, each colour component will vary within a predetermined range of values, for example, 0–255 for an 8-bit data store (corresponding to 0–100% half-tone dot density). In this case, the normalising constant k in equations 1, 2 will be 255. In general, for a data store with N bits per colour component, the normalising constant will be:

$$k=2^{N}-1 \qquad (9)$$

I claim:

1. Apparatus for generating a two-dimensional coloured display in which there is a variation of colour across the display in a predetermined manner, the colour of each pixel in the display being defined by at least one colour components, the apparatus comprising, for each colour component, a memory for storing a pair of gradation curves (X(i), Y(i)) representing the variation in intensity of said colour component in orthogonal directions X, Y across said display; processing means for determining a resultant colour component value V(i,j) for a pixel to be displayed at a location (i,j) in said display in accordance with the following formula:

$$V(i,j)=f[a(X(i)b(Y(j))+c(X(i)d(Y(j))]$$

where the pixel has coordinates i,j and k is a normalizing constant, and where a, c, are functions of X(i), b, d are functions of Y(j) and f is an output function, said functions being chosen such that V(i,j) exhibits no discontinuities for all values of X(i), Y(j); and display means, responsive to said resultant colour component values V(i,j) for displaying a corresponding colour at a position in said display corresponding to that pixel.

2. Apparatus according to claim, 1, wherein said formula is chosen from:

$$V(i,j)=X(i)Y(j)/k$$

and $$V(i,j)=[kX(i)+kY(j)-X(i)Y(j)]/k$$

3. Apparatus according to claim 1, wherein said processing means comprises a suitably programmed computer.

4. Apparatus according to claim 1, wherein said processing means comprises first, second, third and fourth look-up tables defining said respective functions a(Xi), b(Xi), c(Xi), and d(Xi); two multipliers to which outputs from said first and third look-up tables and said second and fourth look-up tables are fed respectively; and an adder for adding the outputs from said multipliers.

5. Apparatus according to claim 4, further comprising means for adding a random variation to the output from said adder.

6. Apparatus according to claim 4, further comprising a normaliser for normalising the output from said adder.

7. Apparatus according to claim 5, further comprising a normaliser for normalising the output from said adder.

* * * * *